United States Patent Office 2,846,403
Patented Aug. 5, 1958

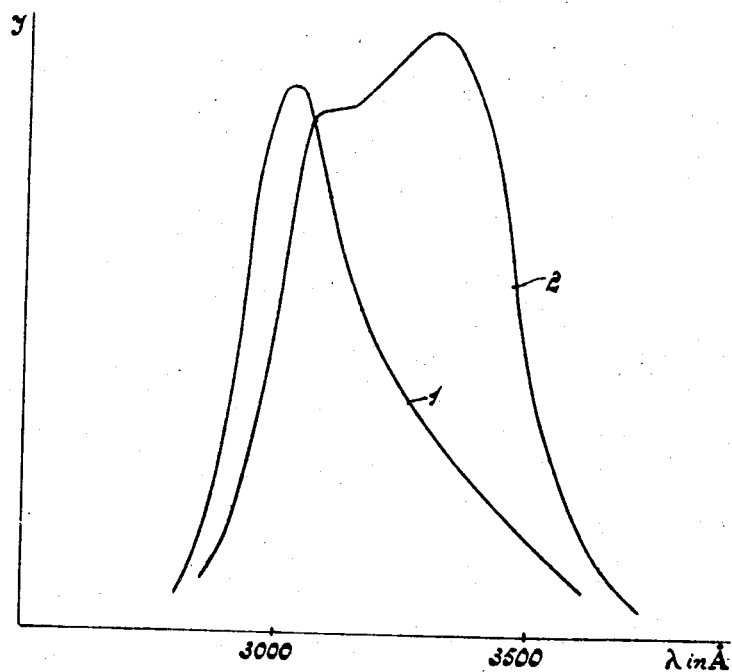

2,846,403

LEAD ACTIVATED BARIUM ZINC SILICATE PHOSPHOR

Age Hylke Hoekstra and Hendrik Anne Klasens, Eindhoven, Netherlands, assignors, by mesne assignments, to North American Philips Company, Inc., New York, N. Y., a corporation of Delaware Application May 17, 1955, Serial No. 508,982

Claims priority, application Netherlands June 2, 1954

1 Claim. (Cl. 252—301.6)

This invention relates to a process of manufacturing a silicate emitting short-waves ultraviolet rays under the action of the radiation produced in a gaseous and/or vapour discharge tube. It also relates to the silicate thus manufactured and to a source of rays comprising the combination of a gaseous and/or vapour discharge tube and the luminescent silicate.

It is known that radiation of a wavelength of about 2900 A. has a favourable effect upon human beings and animals. This radiation is frequently referred to as "erythemal radiation." Consequently, sources of rays have been designed which emit said radiation with sufficient intensity. A known source of rays of this kind comprises the combination of a gaseous and/or vapour discharge tube and a screen containing luminescent substances which can be excited by radiation produced in the discharge and thus emit the erythemal radiation. The luminescent substances which can be used for this purpose, that is to say substances which are readily excited by rays having a wavelength below 2900 A. and then emit the desired radiation, are not particularly numerous, especially if the conversion into the erythemal radiation is also required to be effected with a satisfactory output.

Compounds activated with cerium are known, which are excited by radiation having a wavelength below 2900 A. and which convert this radiation into erythemal radiation, but they have the disadvantage that, when provided in a discharge tube, the conversion with a reasonable output takes place for a comparatively short period only.

One of the substances most suitable for the above-described purpose is an ortho-phosphate of calcium and zinc activated with thallium. Another comparatively satisfactory substance for the same purpose is an orthophosphate of calcium and magnesium activated with thallium.

In view of the great importance for the health of human beings and animals, it is desirable to extend the number of luminescent substances serviceable for the above-mentioned purpose.

The luminescent material may be provided either inside or outside a discharge tube. When provided outside the tube, for example on a reflector, it is necessary that the exciting radiation can leave the discharge tube to reach the luminescent substance. For this purpose the envelope of the discharge tube may consist, for example, of quartz.

In a process according to the invention for manufacturing a silicate emitting shortwave ultraviolet radiation by the action of radiation produced in a gaseous and/or vapour discharge tube, a mixture consisting of compounds of barium, zinc, silicon and lead, which upon heating yields a barium-zinc silicate activated with lead, is heated for 0.5 to 6 hours at a temperature comprised between 900° C. and 1100° C., the atomic ratios in the mixture being such that the following conditions are fulfilled:

$\dfrac{Ba}{Ba+Zn+Si}$ is comprised between 0.05 and 0.25

$\dfrac{Zn}{Ba+Zn+Si}$ is comprised between 0.15 and 0.45

$\dfrac{Si}{Ba+Zn+Si}$ is comprised between 0.40 and 0.80

$\dfrac{Pb}{Ba+Zn+Si}$ is comprised between $5.10^{-2}$ and $10^{-6}$

The substance manufactured by the above-mentioned process may be used very well in combination with a low-pressure mercury vapour discharge tube, the discharge of such a tube emitting very much radiation having a wavelength of 2537 A. This radiation is subsequently converted with a satisfactory output into shortwave ultraviolet radiation. The substance may be applied in the form of a layer to the inner side of the envelope of the discharge tube.

With respect to a process of manufacturing the above-described luminescent substances activated with thallium, which emit erythemal radiation, the process according to the invention affords the advantage that the activator is less volatile and also less poisonous than thallium. The spectral composition of the emitted radiation and the output of the conversion substantially correspond to those of the said known materials.

The best products are obtained if in the manufacture the atomic ratios are also chosen that:

$\dfrac{Ba}{Ba+Zn+Si}$ is comprised between 0.10 and 0.17

$\dfrac{Zn}{Ba+Zn+Si}$ is comprised between 0.30 and 0.45

$\dfrac{Si}{Ba+Zn+Si}$ is comprised between 0.42 and 0.60

$\dfrac{Pb}{Ba+Zn+Si}$ is comprised between $5.10^{-2}$ and $10^{-6}$

A particularly good product obtained by a process according to the invention exhibits the following X-ray diffraction diagram:

| d | I | d | I | d | I |
|---|---|---|---|---|---|
| 11 | 20 | 2.38 | 15 | 1.71 | 25 |
| 6.4 | 15 | 2.28 | 45 | 1.67 | 10 |
| 4.66 | 25 | 2.15 | 15 | 1.66 | 10 |
| 3.32 | 15 | 2.12 | 15 | 1.60 | 10 |
| 3.24 | 100 | 2.02 | 15 | 1.57 | 25 |
| 3.16 | 100 | 1.97 | 40 | 1.51 | 20 |
| 3.01 | 100 | 1.94 | 25 | 1.40 | 15 |
| 2.89 | 15 | 1.92 | 10 | 1.38 | 10 |
| 2.56 | 15 | 1.85 | 10 | 1.33 | 5 |
| 2.50 | 60 | 1.82 | 20 | 1.28 | 20 |
| 2.41 | 20 | 1.77 | 10 | 1.27 | 10 |

It is probable that a process according to the invention always yields an amount of the substance having the above-mentioned X-ray diffraction diagram such that the product of the process of the invention is largely indebted for its shortwave ultraviolet emission to the said substance. The reaction product, in addition to containing the said substance, probably contains residues of the initial materials or disintegration products, for example oxides, thereof and small amounts of compounds which emit no ultraviolet radiation or a less strong ultraviolet radiation, for example willemite.

The influence of the lead percentage is such that in the case of larger amounts of lead, more radiation of longer wavelengths is emitted. This will be illustrated hereinafter with reference to a drawing.

Suitable materials for the compounds used in the process according to the invention are oxides, nitrates and carbonates of barium, zinc or lead. The silicon is preferably added as an oxide. Mixtures of the said compounds are also serviceable very well. The lead may alternatively be added as a fluoride, a part thereof at the same time being active as a flux, thus resulting in the temperature during manufacture being decreased and the crystallisation being enhanced.

Several examples of manufacturing processes are now given hereinafter with reference to the drawing which shows two curves indicating the relationship between the wavelengths on the abscissae in Angstrom units and the intensities of the emitted radiation in arbitrary units on the ordinate of the graph. Both curves are registered upon excitation by radiation having a wavelength of 2537 A.

*Example I*

A mixture consisting of 2.96 gs. of $BaCO_3$
2.43 gs. of ZnO
2.70 gs. of $SiO_2$ is prepared and, suspended in from 30 to 50 ccs. of alcohol, ground in a ball-mill with steatite balls for 16 hours. The suspension has added to it 5 ccs. of an aqueous solution of $Pb(NO_3)_2$ of a concentration of $10^{-5}$ g./mol. Pb per ccm. After intimate mixing, the suspension is evaporated to dryness, pulverised in a mortar and in an Alundum crucible heated in air in an oven at a temperature of 1050° C. for 4 hours. The crucible with its contents is allowed to cool down in the oven to room temperature. The resultant product is pulverised and sieved, if necessary. The spectral distribution upon excitation by a radiation of a wavelength of 2537 A. is indicated by the curve 1, which shows that the maximum lies at about 3030 A.

*Example II*

A mixture consisting of:

12.35 gs. of $BaCO_3$
14.15 gs. of ZnO
15.8 gs. of $SiO_2$ is prepared and, suspended in from 150 to 250 ccs. of alcohol, ground in a ball-mill for 16 hours, after 25 ccs. of an aqueous solution of $Pb(NO_3)_2$ of a concentration of $10^{-4}$ g./mol Pb per ccm. has been added. The suspension obtained is evaporated to dryness and the dry product is pulverised in a mortar, whereafter the powder is heated in a quartz crucible in air in an oven at a temperature of 700° C. for 2 hours. After the crucible with its contents has been allowed to cool down in the oven, the resultant reaction product is again pulverised in a mortar. The resultant powder is again heated in an oven at a temperature of 1010° C. for 4 hours. This heating process also takes place in a quartz crucible with its cover closed. Subsequently, the crucible with its contents is allowed to cool down to room temperature. If necessary, the resultant product is ground and sieved. The spectral distribution upon excitation by a radiation of a wavelength of about 2537 A. substantially corresponds to that of Example I.

*Example III*

A mixture consisting of:

3.30 gs. of $SiO_2$
4.24 gs. of $ZnCO_3$ is prepared and suspended in 50 ccs. of an aqueous solution of 2.94 gs. of $Ba(NO_3)_2$. The suspension has added to it 5 ccs. of an aqueous solution of $Pb(NO_3)_2$ having a concentration of $10^{-4}$ g./mol. Pb per ccm. The resultant suspension is evaporated to dryness, the dry residue is pulverised in a mortar and heated in Alundum crucible in air at 1000° C. in an oven for 4 hours. Subsequently, the crucible with its contents is allowed to cool down in the oven. The resultant product is ground and sieved, if necessary. The spectral distribution upon excitation by radiation having a wavelength of about 2537 A. substantially corresponds to that of the reaction product obtained by the process of Example I.

*Example IV*

A mixture consisting of:

8.00 gs. of $Ba(NO_3)_2$
3.05 gs. of ZnO
4.79 gs. of $SiO_2$
0.14 g. of $PbF_2$ is prepared and pulverised in a mortar. The resultant powder is heated in an Alundum crucible in air in an oven at 950° C. for 1 hour. The fired product is again pulverised in a mortar and in an Alundum crucible heated at 1050° C. in an oven for 1 hour. The crucible with its contents is allowed to cool down in the oven to room temperature. The spectral distribution upon excitation by radiation of a wavelength of about 2537 A. substantially corresponds to that of Example I.

*Example V*

A mixture consisting of:

0.98 g. of $BaCO_3$
5.65 gs. of $ZnCO_3$
3.00 gs. of $SiO_2$ is prepared and suspended in from 30 to 50 ccs. of alcohol, followed by grinding in a ball-mill for 16 hours. The suspension obtained has added to it 5 ccs. of an aqueous solution of $Pb(NO_3)_2$ having a concentration of $10^{-4}$ g./mol. Pb per ccm. The suspension thus obtained is evaporated to dryness and the dry product in an Alundum crucible is heated in air in an oven at 1000° C. for 4 hours. Subsequently, the crucible with its contents is allowed to cool down in the oven. The resultant product is pulverised and sieved, if necessary. The spectral distribution upon excitation by radiation having a wavelength of 2537 A. substantially corresponds to that of Example I.

*Example VI*

A mixture consisting of:

2.96 gs. of $BaCO_3$
2.43 gs. of ZnO
2.70 gs. of $SiO_2$ is suspended in 100 ccs. of alcohol and ground in a ball-mill. The suspension obtained has added to it 14 ccs. of an aqueous solution of $Pb(NO_3)_2$ containing $10^{-4}$ g./mol. Pb per ccm. The suspension thus obtained is evaporated to dryness and the dry residue is heated in an Alundum crucible in air at a temperature of 1000° C. in an oven for 4 hours. Subsequently, the crucible with its contents is allowed to cool down in the oven. The resultant luminescent material is ground and sieved, if necessary. The spectral distribution upon excitation by radiation giving a wavelength of 2537 A. is indicated by the curve 2.

The luminescent reaction products obtained by any of the above-mentioned processes may be provided in the normal known manner as a luminescent layer either in or on a discharge tube or on a reflector.

A comparison between the curves 1 and 2 shows that the higher lead content of the material manufactured according to Example VI results in more radiation of longer wavelengths being emitted.

A luminescent substance prepared in accordance with any method as described above may be applied, together with a suitable binder, e. g. nitrocellulose to the wall of a tubular envelope. After drying the binder is removed by a heating stop and subsequently the electrodes are mounted. Thereafter the tube is filled with the required gas or mixture of gases and sealed so as to be gastight.

What is claimed is:

An ultraviolet luminescent material consisting essentially of a lead activated barium-zinc-silicate having the following X-ray diffraction diagram:

| d | I | d | I | d | I |
|---|---|---|---|---|---|
| 11 | 20 | 2.38 | 15 | 1.71 | 25 |
| 6.4 | 15 | 2.28 | 45 | 1.67 | 10 |
| 4.66 | 25 | 2.15 | 15 | 1.66 | 10 |
| 3.32 | 15 | 2.12 | 15 | 1.60 | 10 |
| 3.24 | 100 | 2.02 | 15 | 1.57 | 25 |
| 3.16 | 100 | 1.97 | 40 | 1.51 | 20 |
| 3.01 | 100 | 1.94 | 25 | 1.40 | 15 |
| 2.89 | 15 | 1.92 | 10 | 1.38 | 10 |
| 2.56 | 15 | 1.85 | 10 | 1.33 | 5 |
| 2.50 | 60 | 1.82 | 20 | 1.28 | 20 |
| 2.41 | 20 | 1.77 | 10 | 1.27 | 10 | in which $d$ is the interatomic spacing in A. and $I$ the intensity of the diffracted X-ray, said material emitting ultraviolet radiation in a wave length range of about 2900 A. to 3500 A. with a peak emission of about 3000 A. in response to radiation having a wave length of about 2537 A.

References Cited in the file of this patent

UNITED STATES PATENTS

| | | |
|---|---|---|
| 2,306,567 | Roberts | Dec. 29, 1942 |
| 2,499,307 | Ginther | Feb. 28, 1950 |
| 2,628,944 | Nagy | Feb. 17, 1953 |